(12) United States Patent
Chen et al.

(10) Patent No.: US 12,357,983 B2
(45) Date of Patent: Jul. 15, 2025

(54) POLYNORBORNENE-BASED ION EXCHANGE MEMBRANES DERIVED FROM PHOSPHONATED POLYMER AND METHODS OF MAKING SAME

(71) Applicant: USA Fortescue IP, INC., Wilmington, DE (US)

(72) Inventors: Mengjie Chen, Seaford, DE (US); Qiuying Zhang, Fairfax, VA (US); Bamdad Bahar, Georgetown, DE (US); Xuzhe Cao, Camden, DE (US); Monica Joan McNicol, Camden, DE (US)

(73) Assignee: USA Fortescue IP, INC., Wilmington, DE (US)

( * ) Notice: Subject to any disclaimer, the term of this patent is extended or adjusted under 35 U.S.C. 154(b) by 0 days.

(21) Appl. No.: 19/000,350

(22) Filed: Dec. 23, 2024

(65) Prior Publication Data
US 2025/0128250 A1    Apr. 24, 2025

Related U.S. Application Data

(63) Continuation of application No. PCT/US2024/024359, filed on Apr. 12, 2024.

(60) Provisional application No. 63/459,191, filed on Apr. 13, 2023, provisional application No. 63/458,915, filed on Apr. 12, 2023.

(51) Int. Cl.
*B01J 39/17*    (2017.01)
*B01J 47/12*    (2017.01)

(52) U.S. Cl.
CPC .............. *B01J 39/17* (2017.01); *B01J 47/12* (2013.01)

(58) Field of Classification Search
CPC .................................. B01J 39/17; B01J 47/12
USPC ........................................................ 521/27
See application file for complete search history.

(56) References Cited

U.S. PATENT DOCUMENTS

| | | | |
|---|---|---|---|
| 7,862,923 B2 * | 1/2011 | Wang .................. | H01M 8/1039 429/188 |
| 12,180,346 B2 * | 12/2024 | Bahar ................. | H01M 8/1062 |
| 2006/0135702 A1 * | 6/2006 | Wang .................. | H01M 8/1081 525/344 |
| 2013/0281555 A1 * | 10/2013 | Yang ................... | H01M 8/1072 521/32 |
| 2021/0046423 A1 * | 2/2021 | Ardo ......................... | C25B 1/27 |
| 2021/0347956 A1 * | 11/2021 | Bahar .................. | H01M 8/222 |

FOREIGN PATENT DOCUMENTS

| | | | | |
|---|---|---|---|---|
| CN | 108777314 B | | 8/2020 | |
| CN | 112349942 B | * | 5/2022 | .......... H01M 8/1018 |
| CN | 115986178 A | * | 4/2023 | |

OTHER PUBLICATIONS

Li, X. et al., "Ring-opening metathesis polymerization for the preparation of polynorbornene-based proton exchange membranes with high proton conductivity", Journal of Membrane Science, vol. 528, pp. 55-63, Dec. 25, 2016.

Li, X. et al., "Molecular dynamics simulation study of a polynorbornene-based polymer: A prediction of proton exchange membrane design and performance", International Journal of Hydrogen Energy, vol. 41, issue 36, pp. 1-10, Jul. 15, 2016.

Li, G. et al., "Norbornene-based acid-base blended polymer membranes with low ion exchange capacity for proton exchange membrane fuel cell", Advanced Composites and Hybrid Materials, vol. 5, pp. 2131-2137, Sep. 15, 2022.

* cited by examiner

*Primary Examiner* — Michael M. Bernshteyn
(74) *Attorney, Agent, or Firm* — Invention To Patent Services; Alex Hobson

(57) ABSTRACT

A proton exchange polymer comprises a polynorbornene copolymer with hydrophobic and hydrophilic blocks that can be phosphonated to produce phosphonic acid functional groups for proton exchange. Also, the polymer may be crosslinked to form quaternary ammonium groups on the side chains. The polynorbornene copolymer may be acid doped to ionically bond phosphonic acids to the quaternary ammonium groups that may for ion pairs for proton exchange. The proton exchange polymer has high temperature stability with the phosphonic acid functional group and can be mechanically durable with cross linking. Proton exchange membranes may utilize the proton exchange membrane in fuel cell and electrolyzer applications.

26 Claims, 5 Drawing Sheets

POLYNORBORNENE-BASED ION EXCHANGE MEMBRANES DERIVED FROM PHOSPHONATED POLYMER AND METHODS OF MAKING SAME

CROSS REFERENCE TO RELATED APPLICATIONS

This application is a continuation of PCT/US2024/024359 having an international filing date of Apr. 12, 2024, which claims the benefit of priority to U.S. provisional patent application No. 63/458,915, filed on Apr. 12, 2023, and to U.S. provisional patent application No. 63/459,191, filed on Apr. 13, 2023; the entirety of all prior applications are hereby incorporated by reference herein.

BACKGROUND OF THE INVENTION

Field of the Invention

This invention is directed to proton exchange polymers, proton exchange membranes derived from the phosphonated polymer and methods of making same.

Background

Anion exchange membranes (AEMs) are solid polymer electrolyte membranes which allow for the transportation of anions (e.g. $OH^-$, $Cl^-$, $Br^-$) under a chemical or electrical potential. AEMs consist of polymers containing fixed positively charged functional groups and mobile negatively charged ions.

Cation exchange membranes (CEMs) are solid polymer electrolyte membranes which allow for the transportation of cations (e.g. $H^+$, $Na^+$) under a chemical or electrical potential. CEMs consist of polymers containing fixed negatively charged functional groups and mobile positively charged ions.

Electrochemical devices (water electrolysis, fuel cells, etc) currently use a proton exchange membrane (PEM) as a crucial component. The PEM, one kind of CEMs, permits proton transport between two electrodes while preventing diffusion of hydrogen. For use in fuel cells and water electrolysis, commercial proton exchange membranes such as Nafion® operate only at high relative humidity (RH) with temperatures below 100° C., requiring humidified hydrogen feed. This is because the perfluorosulfonic acid group needs to be solvated by water to provide high proton conductivity. Therefore, the development of highly conductive PEM materials that do not need external humidification is highly desirable as they can significantly simplify the water management of such electrochemical devices.

Also, both anion and cation exchange membranes must have sufficient strength to be useful in their various applications. Often this need for increased strength requires the membranes to be made thicker which decreases their ionic conductivity.

SUMMARY OF THE INVENTION

This invention is directed to proton exchange polymers and proton exchange membranes derived from the phosphonated polymer. An exemplary proton exchange polymer includes a backbone, side chain and functional group comprising the phosphonated polymer. The phosphonated polymer provides high proton conductivity and high temperature resistance as the phosphonic acid functional group is covalently bonded to the proton exchange polymer. Also, the polymer may be doped with phosphoric acid to create ion pairing to further stabilize and increase temperature stability of the polymer, which increasing proton conductivity. The side chain of the proton exchange polymer may be an aliphatic hydrocarbon with two or more carbons, four of more carbons, eight or more carbons, ten or more carbons, twelve or more carbons, and as many as 20 carbons to enable high ion mobility through the proton exchange polymer.

The proton exchange polymer may be prepared by immersing AEM in base solution (e.g., 0.1M NaOH) for 24 hours to ion-exchange $Br^-$ to $OH^-$ and phosphoric acid solution (e.g., 85 wt. %) for 12 h sequentially.

The present invention provides a mechanically reinforced ion exchange membrane comprising a functional polymer based on a polynorbornene backbone with quaternary ammonium and phosphonic acid ion-pair functional groups in the side chains and an inert porous reinforcement material. Typically, a proton exchange membrane is prepared firstly by imbibing the porous reinforcement substrate with a polymer solution of a non-ionic precursor polymer followed by conversion of a functional moiety on the polymer to form a trimethyl ammonium cation. Such a conversion can be accomplished by treatment of the precursor polymer membrane with trimethylamine (amination process). The proton exchange membrane is functionalized by immersing in the sodium hydroxide solution and phosphoric acid solution sequentially to form the ion exchange membrane with quarternary ammonium-phosphonate anion ion pair.

In addition, an optional chemical crosslinking reaction can also be used to toughen the polymer. Such a conversion can be accomplished by treatment of the precursor polymer by a diamine or triamine, which is typically performed before the amination reaction.

Exemplary polynorbornene may have functional groups selected from the group of quaternary ammoniums, tertiary diamines, phosphonium, benz(imidazolium), sulphonium, guanidinium, metal cations, pyridinium, hexamethyl guaniclinium. Preferably the functional group is quaternary ammonium.

A proton exchange membrane made with the proton exchange polymer described herein may be used in polymer electrolyte membranes (PEMs) and/or catalyst ionomeric binders for electrodes in PEM elelctrodelyzer or PEM fuel cells, and more particularly for high-temperature PEM electrolyzers or fuel cells. High-temperature PEM electrolyzers that use phosphonated polymers of the present disclosure suffer from reduced or no acid leaching because, in at least some examples, phosphonic acid moieties are covalently bonded to the backbone of the polymers. A phosphonated polymer include a polynorbornene backbone, with certain monomer having phosphonic acid group. A phosphonic acid group may include phosphonic acid or a functional group that is hydrolysable into phosphonic acid.

The proton exchange polymer may be made into a proton exchange membrane for use in various proton transport application described herein. The proton exchange membrane may be a planar sheet of polymer with a thickness of no more than about 200 μm, no more than about 250 μm, no more than about 150 μm no more than about 100 μm, no more than about 50 μm, no more than about 25 μm, no more than about 15 μm, no more than about 15 μm no more than about 5 μm and any range between and including the thickness values provided. The thinner the proton exchange membrane, the higher the conductance but some mechanical durability may be compromise. Typically, the thickness of the functionalized membrane is 75 micrometers or less, more typically 50 micrometers or less, and in some embodiments 10 micrometers or less. The thickness of the reinforced proton exchange membrane may be very thin to maintain high proton conductivity through the membrane and may be about 75 micrometers or less, about 50 micrometers or less, about 25 micrometer or less, about 15 micrometers or less and in some embodiments 10 micrometers or less, and any range between and including the thickness values provided.

A proton exchange membrane may include a support layer, such as a porous reinforcement substrate that is partially imbibed with or filled with the proton exchange polymer. A support layer may be made from polymer group consisting of polyphenylene sulfide, polyolefins, polyamides, polycarbonates, cellulosics, polyacrylates, copolyether esters, polyamides, polyarylether ketones, polysulfones, polybenzimidazoles, fluoropolymers, and chlorinated polymers. A support layer may be a hydrocarbon support layer, polyethylene support layer, fluoropolymer support layer such as polytetrafluoroethylene, a polyetheretherketone support layer, and/or a polyethylene terephthalate support layer. A support layer may have pores and wherein the proton exchange polymer extends through the pores from a first side to an opposing second side. A proton exchange membrane may have a plurality of support layers.

Exemplary polynorbornene may have additives selected from a group consisting of radical scavengers, plasticizers, fillers, anion or proton conducting material, crosslinking agent.

Polymer electrolyte membrane (PEM) electrolyzers and fuel cells are two of the most promising energy-efficient and environmentally friendly energy conversion devices. Currently available polymer electrolyte membrane technologies include low temperature PEM electrolyzers, which utilize perfluorosulfonic acid membranes. Low-temperature PEM electrolyzers and fuel cells are limited by a requirement of a high level of humidification for proton conduction and low efficiency. Develop high-temperature PEM electrolyzers and fuel cells can facilitate (i) higher catalytic activity at higher temperatures (less catalyst needed); (ii) No water needed (elimination of humidifiers); (iii) Easier thermal management (smaller radiators). All of these lead to lower device costs.

These membranes must have sufficient strength to be useful in their various applications. Often this need for increased strength requires the membranes to be made thicker which decreases their ionic conductivity. One way to make thinner membrane with high strength is preparing the composite membrane, so called the reinforced membrane.

The present invention provides a method to prepare phosphonated polynorbornene polymer and a reinforced ion exchange membrane based on this phosphonated polymer. The membrane comprising a functional polymer based on a polynorbornene backbone and phosphonic acid groups in the side chains and an inert porous reinforcement substrate.

In addition, an optional chemical crosslinking reaction can also be used to toughen the polymer. Such a conversion can be accomplished by treatment of the polynorbornene by a crosslinking agent such as diamine or triamine, which is typically performed before the phosphonation reaction.

Exemplary phosphonated polynorbornene membrane may have additives selected from a group consisting of radical scavengers, plasticizers, fillers, anion conducting material, crosslinking agent and recombination catalyst.

A proton conducting polymer of may include a radical scavenger including, but not limited to, Cerium (Ce), Manganese (Mn), phenolic compounds, nitrogen-containing heterocyclic compounds, quinones, amine, phosphites, phosphonites, and thioesters.

A proton conducting polymer of may include a free radical inhibitor including, but not limited to, inorganic free radical scavenger such as metal organic frameworks (MOF) including cerium oxides and metal oxide.

A proton conducting polymer of may include a plasticizer including, but not limited to, nylon 6,6, Glycerol, ionic liquids.

A proton conducting polymer of may include a filler including, but not limited to, hygroscopic inorganic fillers and carbon-based materials selected from the group consisting of oxides of aluminum, silicon, titanium, zirconium and zirconium phosphate, cesium phosphate, zeolites, clays and carbon black, multiwall carbon nanotubes, reduced graphene oxide.

A proton conducting polymer of may include a crosslinking agent including, but not limited to, tertiary diamine head groups which include DABCO (1,4-diazabicyclo[2,2,2]octane) and TMHDA (N,N,N,N-tetramethylhexane diammonium), 1,4-diiodobutane.

A proton conducting polymer of may include a recombination catalyst including, but not limited to, platinum nanoparticles, platinum nanoparticles supported on carbon, platinum nanoparticles supported on oxides, Platinum alloy nanoparticles, platinum alloy nanoparticles supported on carbons, platinum alloy nanoparticles supported on oxides.

The term proton exchange is used to describe proton exchange polymer or proton exchange membranes made therefrom, throughout the specification and claims.

The summary of the invention is provided as a general introduction to some of the embodiments of the invention and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description explaining the principles of the invention.

DETAILED DESCRIPTION OF THE ILLUSTRATED EMBODIMENTS

Figure 1:
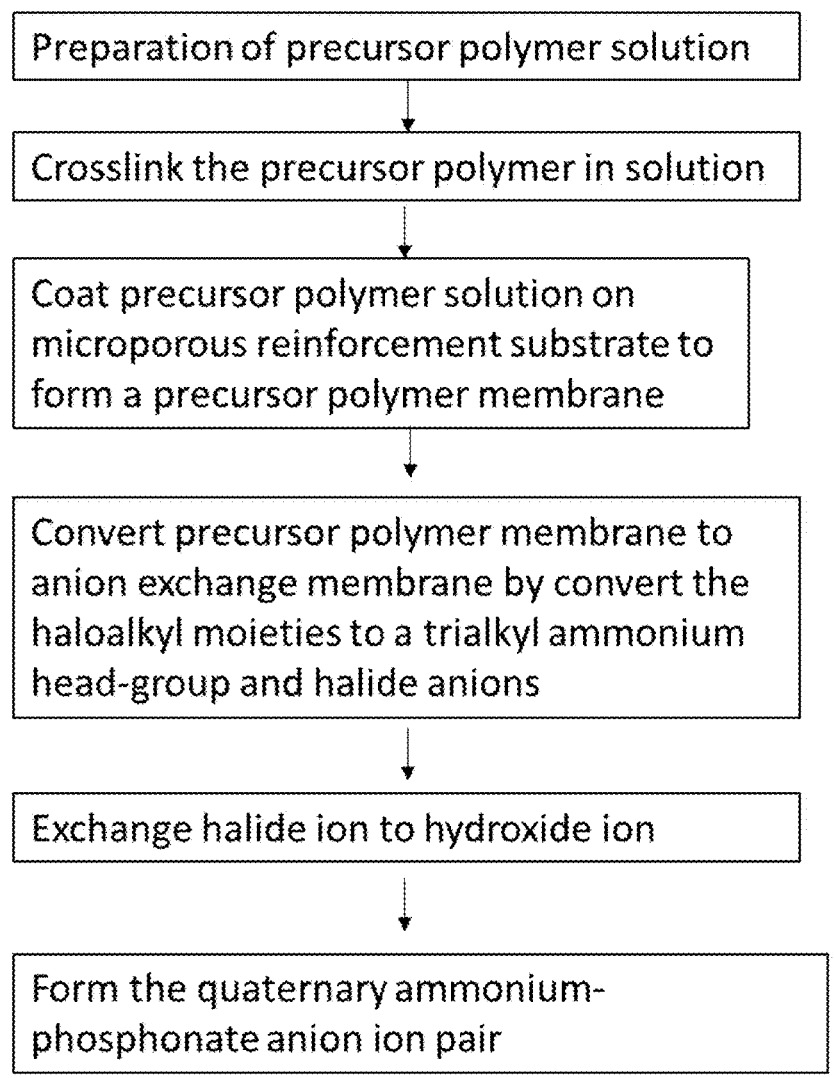
FIG. 1 shows a flow diagram of a method of making an exemplary proton exchange polymer as described herein.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations, and improvements of the described embodiments, will occur to those skilled in the art and all such alternate embodiments, combinations, modifications, improvements are within the scope of the present invention.

Also as used herein, "and/or" refers to and encompasses any and all possible combinations of one or more of the associated listed items, as well as the lack of combinations when interpreted in the alternative ("or").

A weight percent (wt. %) of a component, unless specifically stated to the contrary, is based on the total weight of the formulation or composition in which the component is included.

A mole percent (mol %) of a component, unless specifically stated to the contrary, is based on the total number of moles of each unit of the formulation or composition in which the component is included.

The term "crosslinking agent" or "crosslinker" as used herein refers to a molecule, ion or other chemical unit capable of forming a chemical unit linking two parts of the same polymer chain or two different polymer chains.

The term "alkyl" as used herein is a branched or unbranched saturated hydrocarbon group of 1 to 20 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted.

As used herein, "copolymer" is a polymer made by reaction of at least two different monomers, with units of more than one kind.

The term "monomer" as used herein refers to one of the constituent units used to synthesize a polymer.

The term "quaternary ammonium" as used herein is represented by the formula $NA^{4+}$ where A can be hydrogen or hydrocarbons and N is nitrogen.

An exemplary polynorbornene-based proton exchange polymer is prepared by vinyl addition polymerization of halogenated alkyl norbornene and alkyl norbornene. Note that the side chain segment can be modified to engineer the channel of polymer by adjusting the cation tether length, the molecular length of crosslinker, and cross-linker functionality.

One aspect of the invention relates to a polynorbornene copolymer comprising one or more norbornene-based hydrophilic blocks and one or more hydrophobic blocks. The polynorbornene copolymer is synthesized via vinyl addition polymerization method. In some embodiments, the one or more hydrophobic blocks are norbornene-based hydrophobic blocks. Norbornene-based hydrophobic blocks comprise hydrophobic monomers having a norbornene structure substituted with a saturated C1-C20 alkyl chain (e.g., C1, C2, C3, C4, C5, C6, C7, C8, C9, C10, C11, C12, C13, C14, C15, C16, C17, C18, C19, or C20 alkyl chain) branched or unbranched. In some embodiments, the alkyl chain may be halogenated (i.e., comprising one or more halogens (e.g., Cl, Br, F, or I) located throughout the alkyl chain. For example, in some embodiments, the alkyl chain is halogenated with bromine, chlorine or fluorine. In some embodiments, the halogen is located at the terminal position of the halogenated alkyl chain of the hydrophobic monomer. In some embodiments, the alkyl chain is non-halogenated. In some embodiments, the alkyl chain is a C3-C6 alkyl chain. When one or more norbornene-based hydrophobic monomers are combined a "norbornene-based hydrophobic block" is formed, wherein the number (n) of norbornene-based hydrophobic monomers can vary. In some embodiments, the number (n) of norbornene-based hydrophobic monomers is from about 10 to about 1,000, from about 100 to about 1,000, or from about 500 to about 1,000. For example, a norbornene-based hydrophobic block present in a multiblock copolymer of the invention comprises a structure represented by structure below, where wherein Ri is a saturated C1-C20 alkyl chain or halogenated alkyl chain branched or unbranched; and n is an integer from 1 about 1500:

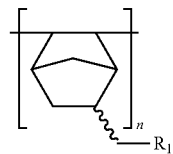

The phosphonated polymers of the invention are ion exchange polymers with phosphonated polynorbornene backbones. Note that the side chain segment can be modified to engineer the channel of polymer by adjusting the cation tether length, the molecular length of crosslinker, and cross-linker functionality.

The ion exchange membranes of the invention are PEMs composed of all-hydrocarbon backbones with long alkyl tethered side chains which contain a fixed phosphonic acid head-group. The polymers exhibit suitable chemical stability and physical characteristics that are desirable for use in electronic and electrochemical devices.

Example 1

FIG. 1 shows a method or process for making an exemplary proton exchange membrane as described herein. In one embodiment, a proton exchange membrane is prepared by dissolving the precursor polymer in toluene at a 12.5% weight ratio i.e. 12.5 grams of polymer to 87.5 g of solvent. The mixture was stirred until homogenous and translucent. The concentration of the precursor polymer solution can vary between 0.1 wt % to 60 wt. %, and may between about 1 wt. % and 30 wt %, and may be about 5 wt. % or more, 10 wt. % or more, 15 wt. % or more, 20 wt. % or more, 30 wt. % or more, 50 wt % or more, or from about 5 wt. % to about 60 wt. % and any other range between and including the values provided.

The precursor polymer solution may then be applied or coated onto a support layer, such as a microporous support layer (e.g., expanded polytetrafluoroethylene) tensioned to maintain dimensions upon application of the precursor polymer solution, such as being restrained in a chemically resistant plastic frame. The precursor polymer solution may then be coated on to the microporous reinforcement substrate by a doctor blade or brush or by dipping. The membrane may then be dried at room temperature.

The precursor polymer may be converted to a proton exchange membrane by exchanging with phosphoric acid. The bromide groups may be reacted with triethyl phosphite to produce dimethyl phosphite that can then be reactive with said an acid to configure phosphonic acid as functional groups on the side chains.

Figure 2:
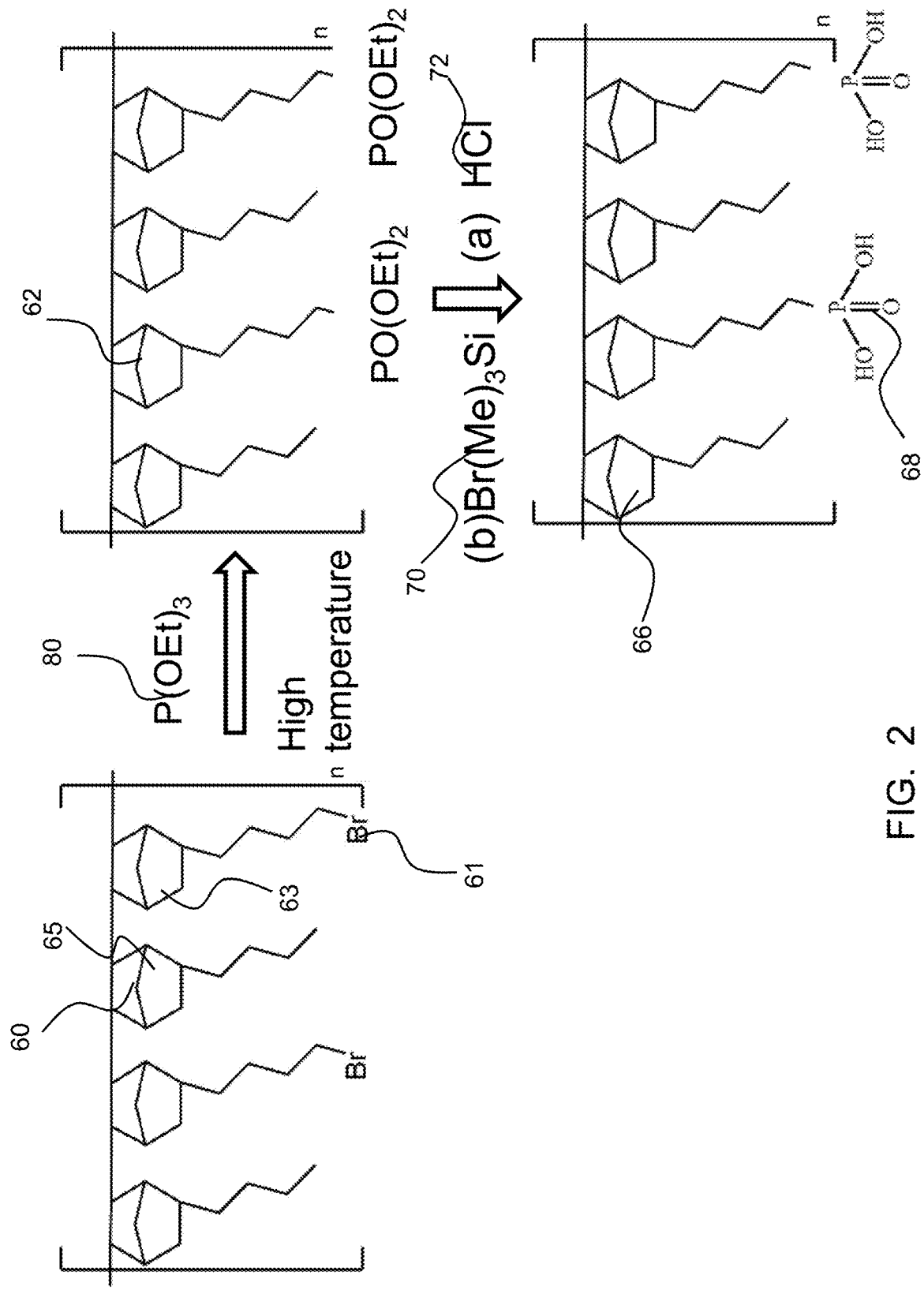
FIG. 2 shows the polymer synthetic scheme.

FIG. 2 shows the synthetic scheme for the phosphonation of a precursor polymer to produce a phosphonated polymer. In one embodiment, the precursor polymer 60 was added drop wise to triethyl phosphite 80 slowly under high temperature (e.g., 180 degree c.) and magnetically stirred overnight. This step is called addition of phosphonate esters. After the reaction was complete the solution with the intermediate polymer 62 was cooled. The intermediate polymer may have dimethyl phosphite on the side chains. There are two (2) options to deprotect of phosponate esters and form phosphonated polymer. First option: a) dissolve the intermediate polymer 62 in chloroform ($CHCl_3$) and then add bromotrimethylsilane ($BrMe_3Si$) 70 at room temp for 24 hours while stirring followed by aqueous work up. The resulting powder was filtered at least three times. Second option: b) Reflux the phosphonate esters in the hydrochloric acid 72 for 12 h. The resulting powder was filtered at least three times. A proton exchange polymer 66 having covalently bonded phosphonic acid 68 functional groups, covalently bonded to the side chain is produced. The precursor polymer may have bromide 61 groups as terminal group of a side chain on a hydrophilic block 63 of the co-polymer and a hydrophobic block 65.

Figure 3:
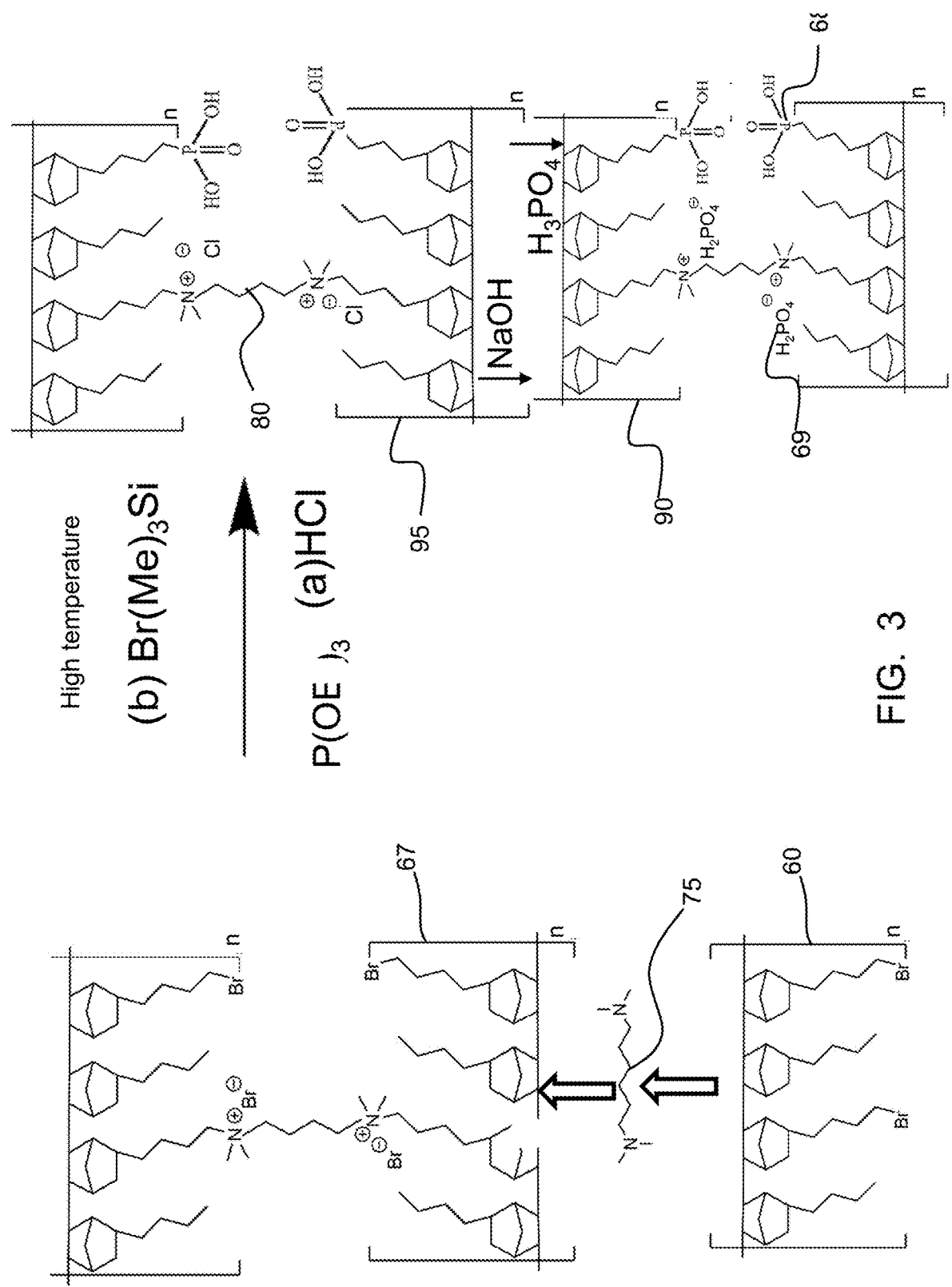
FIG. 3 shows the polymer synthetic scheme with an additional crosslinking step and functionalization steps.

FIG. 3 shows an optional step to cross link the precursor polymer 60. The precursor polymer 60 solution can contain a crosslinker 75, such as tetramethyl hexyldiamine (TMHDA), to cross-link some of the haloalkyl moieties to produce a cross-linked precursor polymer 67 having a crosslinker 80. The cross-linking is preferably carried out before the phosphonation step as shown and described in FIG. 2, however, cross-linking may also be carried out after phosphonation. As shown in FIG. 3 a phosphonated cross-linked proton exchange polymer 95 may be functionalized to produce phosphonic acid functional groups as shown and described in FIG. 2. The crosslinker 80 extends between side chains which may be along the same backbone of the proton exchange polymer or with a second co-polymer, as shown. Other crosslinkers may be used to produce quaternary ammonium functional groups that are cross linked and that may be subsequently dopped with phosphoric acid to produce ionically bonded phosphonic acid 69 functional groups, ionically bonded to the quaternary ammonium. The proton exchange polymer 90 is crosslinked and has both ionically bonded phosphonic acid 69 and covalently bonded phosphonic acid 68 functional groups to provided increased proton conductivity. Also, the quaternary ammonium is a functional group. Cross-linking may greatly improve the mechanical properties of the proton exchange polymer by increasing modulus, toughness, and preventing swelling and degradation. The cross-linked proton exchange polymer may be much more dimensionally stable and thermally stable, having less thermal expansion.

Figure 4:
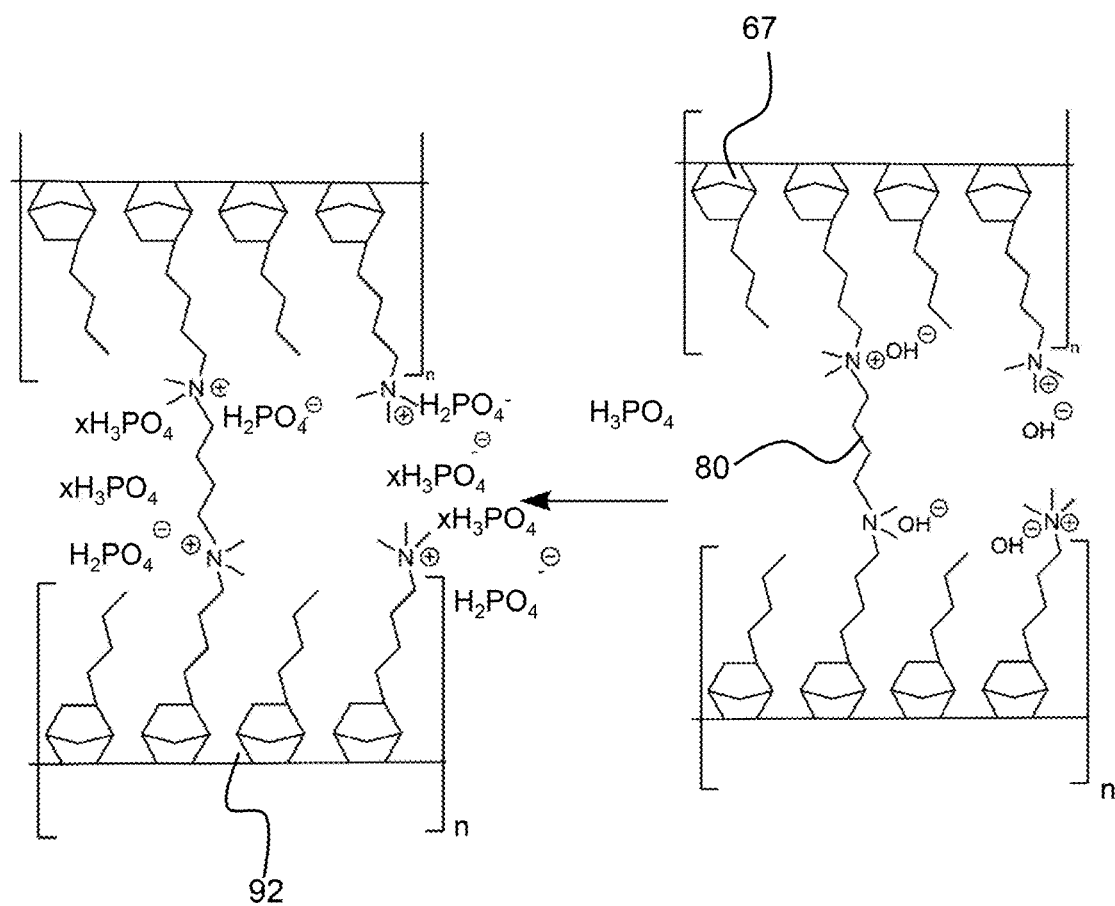
FIG. 4 shows the exemplary proton exchange polymer with dopped phosphoric acid that forms an ion pair with the quaternary ammonium.

As shown in FIG. 4, a crosslink precursor polymer 67 as shown and described for FIG. 3, is dopped with phosphoric acid and subsequently dopped with phosphoric acid to produce a proton exchange polymer 92 with only ionically bonded phosphonic acid 69 functional groups. The precursor polymer did not undergo phosphonation however, so this proton exchange polymer 92 has only ionically bonded phosphonic acid 69 functional groups and quaternary ammonium functional groups. The ionically bonded phosphonic acid 69 functional groups are ionically bonded to the quaternary ammonium.

Example 2: Proton Exchange Membrane

A precursor polymer was coated onto a support structure to produce a precursor proton exchange membrane. A crosslinker 75 such as (N,N,N',N'-Tetramethyl-1,6-hexanediamine) was added to crosslink the precursor polymer. Note this step could happen before or after the amination process. After the crosslinking, the crosslinked polymer was aminated in the trimethylamine to form quaternary ammonium groups. Then, the halide ions were exchanged with hydroxide ions. The proton exchange membrane was converted to hydroxide exchange membrane by immersed in the sodium hydroxide solution. Then, the hydroxide exchange membrane was converted to proton exchange polymer with ion pair by immersing the polymer in the phosphoric acid solution. Dihydrogen phosphate anion ($H_2PO^{4-}$) was formed after the first molecule of phosphoric acid (PA) was deprotonated by hydroxide anion. The resulting ion exchange membrane was left alone for 72 h to let additional free phosphoric acid molecules leach out, during which the membrane is gently blotted by Kimwipe every 12 h. In some embodiments, there are some phosphoric acids remaining in the proton exchange polymer. The number of phosphoric acid molecules per phosphonic acid group was about between 1 to 15.

A precursor polymer or intermediate polymer of proton exchange polymer may be coated onto, imbibed, or otherwise combined with a support structure, such as a porous or microporous support membrane to produce a proton exchange membrane. Multiple coatings can be applied to increase the membrane thickness or to facilitate filling of the porous reinforcement substrate.

The precursor polymer membrane can be soaked in trimethylamine solution in water or ethanol to convert the haloalkyl moieties within the precursor polymer to a trialkyl ammonium head-group enabling anion conduction within the membrane (i.e., proton exchange membrane).

Optionally, the precursor polymer solution can contain diamine or triamine, such as tetramethyl hexyldiamine (TMHDA), to cross-link some or all of the haloalkyl moieties. The cross-linking is preferably carried out before the coating process and before the amination reaction in trimethylamine; however, cross-linking may also be carried out after amination.

A proton exchange membrane may be soaked in the base solution (e.g., 1M NaOH) to exchange the mobile halogen counter ion (e.g. bromide, chloride or iodide) with hydroxide ions (OH$^-$). The resulting membrane is washed with DI water to remove residual NaOH and then immersed in phosphoric acid solution for forming the quaternary ammonium-phosphonate ion-pair membrane, which demonstrates both anion and cation exchange capabilities.

Figure 5:
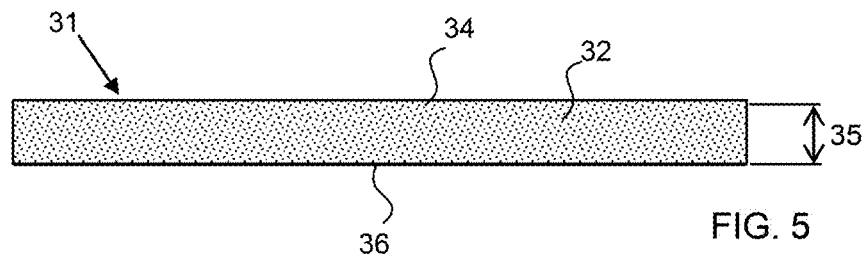
FIG. 5 shows cross-sectional view of an exemplary proton exchange membrane comprising a thin sheet, less than 200 µm thick of proton exchange polymer.

As shown in FIG. 5, a cation exchange membrane 31 is a planar thin layer of proton exchange polymer 32 having a planar first side 34 and second side 36, wherein the first side and second side extend in parallel to produce a substantially uniform thickness of the proton exchange membrane, with variations in thickness of no more than about 35% and preferably no more than 25% or even 10%.

Figure 6:
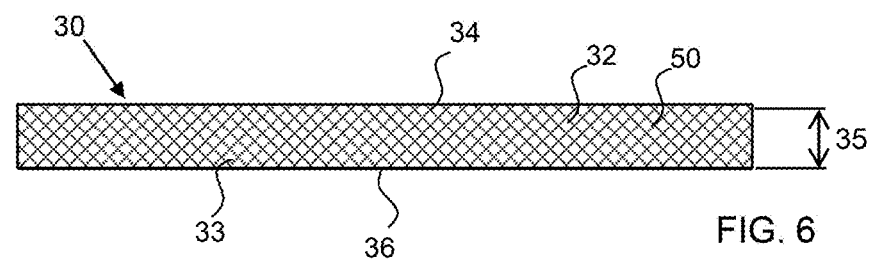
FIG. 6 shows cross-sectional view of an exemplary porous reinforced support having a porous structure and pores therein, wherein the proton exchange polymer substantially fills the pores of the scaffold support.

As shown in FIG. 6, the proton exchange polymer 32 may be configured in a composite proton exchange membrane 30 has a support layer 33 and with proton exchange polymer 32 extending through the pores 50 from a first side 34 or anode side, to a second side 36 or cathode side. The thickness 35 of the composite proton exchange membrane 30 may be about 200 μm or less, about 150 μm or less, about 100 μm or less, about 50 μm or less, about 30 μm or less, about 25 μm or less, about 15 μm or less, about 10 μm or less, or even 5 μm or less.

Figure 7:
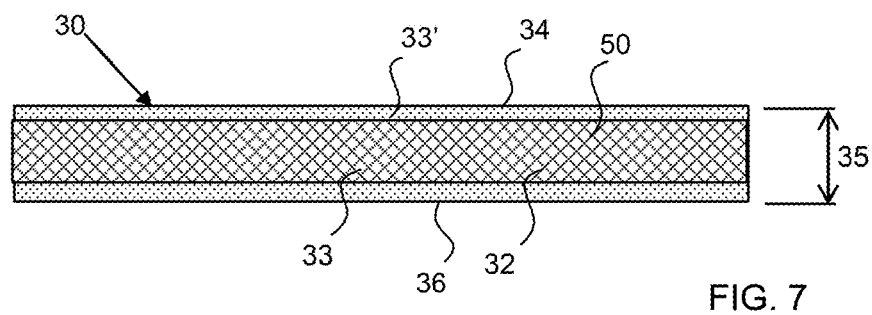
FIG. 7 shows a cross-sectional view of an exemplary ultra-thin composite proton exchange polymer film having a layer of proton exchange polymer on either side of the porous reinforced support.

As shown in FIG. 7, a composite proton exchange membrane 30 has a support layer 33 with proton exchange polymer 32 extending through the pores 50 of the support layer from a first side to a second side 36 of the support layer. Also, there is a layer of proton exchange polymer extending on the anode and cathode side, or first 34 and opposing second side of the composite proton exchange membrane 30. The thickness 35 of the composite proton exchange membrane 30 may be 50 μm or less, about 30 μm or less, about 25 μm or less, about 15 μm or less, about 10 μm or less, or even 5 μm or less. The proton exchange polymer 32 may be configured on just one side of a support layer 33, or may be only with the support layer or on one side and within at least partially the support layer.

Figure 8:
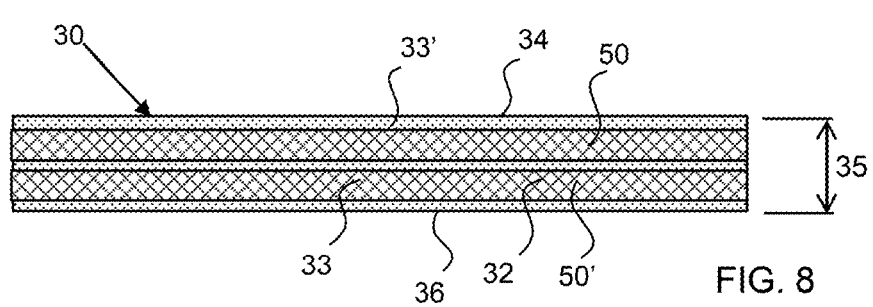
FIG. 8 shows cross-sectional view of an exemplary ultra-thin composite proton exchange polymer film formed by imbibing proton exchange polymer copolymer into a porous reinforced support using solution casting process, wherein the proton exchange polymer substantially fills the pores of the reinforced support.

As shown in FIG. 8, a composite proton exchange membrane 30 has a plurality of support layers 33 and 33' and with proton exchange polymer 32 extending through the pores 50, 50' of each layer from a first side to a second side 36 of each support layer. Also, there is a layer of proton exchange polymer extending on the anode and cathode side, or first 34 and opposing second side of the composite proton exchange membrane 30. The thickness 35 of the composite proton exchange membrane 30 may be 50 μm or less, about 30 μm or less, about 25 μm or less, about 15 μm or less, about 10 μm or less, or even 5 μm or less.

Figure 9:
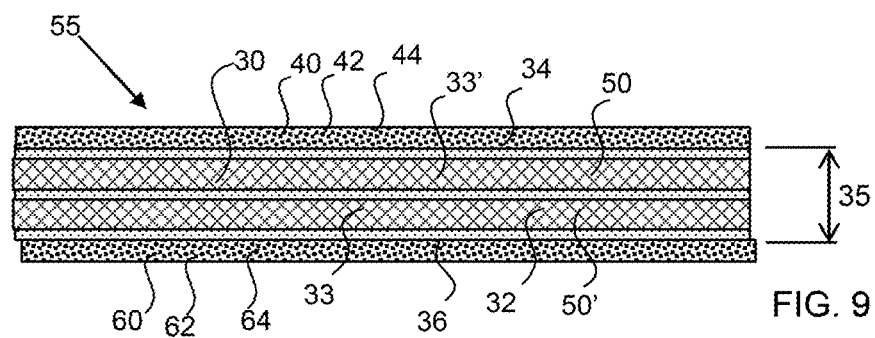
FIG. 9 shows cross-sectional view of an exemplary membrane electrode assembly comprising a composite proton exchange membrane with a cathode on a first side and an anode on a second side.

As shown in FIG. 9, the composite proton exchange membrane 30 may be incorporated into a membrane electrode assembly 55, having an anode 40 and cathode 60 on an opposing side of the composite proton exchange membrane 30. The anode may comprise an anode catalyst 42 and may also include an anode proton exchange polymer 44, which may be the same or different from the proton exchange polymer in the composite proton exchange membrane 30 or proton exchange membrane. Likewise, the cathode may comprise a cathode catalyst 62 and may also include an anode proton exchange polymer 64, which may be the same or different from the proton exchange polymer in the composite proton exchange membrane 30 or proton exchange membrane.

It will be apparent to those skilled in the art that the mentioned embodiment can be scaled up to a roll-to-roll, continuous process.

In the case of either embodiment, multiple coatings can be applied to increase the membrane thickness or to facilitate filling of the porous reinforcement substrate. Multiple reinforcement can also be applied to increase the membrane mechanical strength.

What is claimed is:

1. A proton exchange polymer comprising:
   a) a backbone comprising polynorbornene;
   b) a side chain extending from the backbone; and
   c) a functional group coupled to said side chain and comprising phosphonic acid covalently bonded to said side chain.

2. The proton exchange polymer of claim 1, wherein the functional group further comprises quaternary ammonium.

3. The proton exchange polymer of claim 2, further comprising ionically bonded phosphonic acid that forms an ion pair with the quaternary ammonium.

4. The proton exchange polymer of claim 3, further comprising a cross-linker;
   wherein the cross-linker is in a concentration of 0.1 mol % to 30 mol %.

5. The proton exchange polymer of claim 4, wherein the cross-linker is a branched crosslinker.

6. The proton exchange polymer of claim 5, wherein the branched cross-linker comprises triamine.

7. The proton exchange polymer of claim 4, wherein the cross-linker includes a diamine compound.

8. The proton exchange polymer of claim 7, wherein the cross-linker includes tetramethyl hexyldiamine (TMHDA).

9. The proton exchange polymer of claim 1, further comprising a secondary crosslinking agent that are tertiary diamine head groups which include DABCO (1,4-diazabicyclo[2,2,2]octane) and TMHDA (N,N,N,N-tetramethylhexane diammonium), 1,4-diiodobutane.

10. The proton exchange polymer of claim 1, wherein the side chain comprises aliphatic hydrocarbon side chains.

11. The proton exchange polymer of claim 10, wherein the aliphatic hydrocarbon side chains comprise four or more carbons.

12. The proton exchange polymer of claim 1, wherein the backbone is a co-polymer of hydrophobic blocks and hydrophilic blocks.

13. The proton exchange polymer of claim 12, wherein the hydrophilic block comprises bromopropyl norbornene.

14. The proton exchange polymer of claim 12, wherein the hydrophobic block comprises Butyl norbornene.

15. A proton exchange membrane comprising the proton exchange polymer of claim 1, wherein the proton exchange membrane is a thin sheet of material having a thickness of less than 200 μm.

16. The proton exchange membrane of claim 15, further comprising a recombination catalyst selected from the group consisting of platinum nanoparticles, platinum nanoparticles supported on carbon, platinum nanoparticles supported on oxides, platinum alloy nanoparticles, platinum alloy nanoparticles supported on carbons, and platinum alloy nanoparticles supported on oxides.

17. The proton exchange membrane of claim 15, further comprising a radical scavenger that is an antioxidant selected from the group consisting of Cerium (Ce), Manganese (Mn), phenolic compounds, nitrogen-containing heterocyclic compounds, quinones, amine, phosphites, phosphonites, and thioesters.

18. The proton exchange membrane of claim 15, further comprising a free radical inhibitor selected from the group consisting of inorganic free radical scavenger such as metal organic frameworks (MOF) including cerium oxides and metal oxide.

19. The proton exchange membrane of claim 15, further comprising a plasticizer selected from the group consisting of nylon 6,6, Glycerol, ionic liquids.

20. The proton exchange membrane of claim 15, further comprising a filler selected from the group consisting of oxides of aluminum, silicon, titanium, zirconium and zirconium phosphate, cesium phosphate, zeolites, clays and carbon black, multiwall carbon nanotubes, reduced graphene oxide.

21. The proton exchange membrane of claim 15, further comprising:
   a) a support layer;
   wherein the proton exchange polymer extends through the support layer from a first side to a second side of the support layer to produce a composite proton exchange membrane.

22. The proton exchange membrane of claim 21, wherein the support layer has pores and wherein the proton exchange polymer extends on a first side of said support layer.

23. A proton exchange system comprising:
   a) a proton exchange membrane comprising the proton exchange polymer claim 1;
   b) an anode; and
   c) a cathode;
   wherein protons are conducted through the proton exchange membrane.

24. The proton exchange system of claim 23, wherein the proton exchange membrane is heated to a temperature of 130° C. or more.

25. A method of making the proton exchange polymer of claim 1, comprising:
   a) providing said polynorbornene co-polymer comprising a backbone and side chains; and
   b) phosphonating the polynorbornene co-polymer to produce a phosphonated norbornene co-polymer comprising phosphonic acid groups covalently bonded to said side chains.

26. The method of claim 25, further comprising crosslinking the polynorbornene co-polymer with a crosslinker, prior to phosphonating.

* * * * *